United States Patent

Saito et al.

[11] Patent Number: 5,815,397
[45] Date of Patent: Sep. 29, 1998

[54] METHOD OF ANALYZING FACTORS AFFECTING PRODUCT QUALITY AND ADJUSTING MOLDING CONDITIONS FOR INJECTION MOLDING MACHINE

[75] Inventors: Osamu Saito, Oshino-mura; Hiroshi Watanabe, Fujiyoshida; Kenji Araki, Oshino-mura, all of Japan

[73] Assignee: Fanuc Ltd., Yamanishi, Japan

[21] Appl. No.: 666,370

[22] PCT Filed: Oct. 24, 1995

[86] PCT No.: PCT/JP95/02182

§ 371 Date: Jun. 27, 1996

§ 102(e) Date: Jun. 27, 1996

[87] PCT Pub. No.: WO96/13370

PCT Pub. Date: May 9, 1996

[30] Foreign Application Priority Data

Oct. 27, 1994 [JP] Japan ..................... 6-286148

[51] Int. Cl.$^6$ .................................. G06F 19/00
[52] U.S. Cl. .................. 364/475.09; 364/474.05; 364/468.16; 264/40.1; 425/135; 425/162
[58] Field of Search ............... 364/475.09, 475.02, 364/475.05, 475.06, 475.07, 475.08, 468.15, 468.16, 468.17, 552, 148, 152, 172; 264/40.1–40.7; 425/149, 162, 169, 135

[56] References Cited

U.S. PATENT DOCUMENTS

| | | | |
|---|---|---|---|
| 5,301,120 | 4/1994 | Magario | 364/475.06 |
| 5,350,546 | 9/1994 | Takeuchi et al. | 364/475.08 X |
| 5,350,547 | 9/1994 | Yamaguchi et al. | 364/475.09 X |
| 5,442,562 | 8/1995 | Hopkins et al. | 364/468.15 |
| 5,550,744 | 8/1996 | Steinbichler | 364/476.01 |

FOREIGN PATENT DOCUMENTS

| | | |
|---|---|---|
| 0 368 300 | 5/1990 | European Pat. Off. . |
| 0 372 899 | 6/1990 | European Pat. Off. . |
| 0 377 736 | 7/1990 | European Pat. Off. . |
| 53-20081 | 2/1978 | Japan . |
| 57-212042 | 12/1982 | Japan . |
| 2-241718 | 9/1990 | Japan . |
| 3-116301 | 5/1991 | Japan . |

OTHER PUBLICATIONS

Patent Abstracts of Japan, vol. 011, No. 197 (p–589), 25 Jun. 1987 of JP 62 020008 A (Toshiba Corp), 28 Jan. 1987.

Patent Abstracts of Japan, vol. 009, No. 079 (p–347), 9 Apr. 1985 of JP 59 211103 A (Nippon Seikosho KK), 29 Nov. 1984.

Patent Abstracts of Japan, vol. 010, No. 333 (M–534), 12 Nov. 1986 of JP 61 137662 A (Toshiba Mach Co Ltd; Others:01), 25 Jun. 1986.

Primary Examiner—Joseph Ruggiero

[57] ABSTRACT

A method of analyzing factors affecting the product quality performs adjustment of molding conditions for an injection molding machine. Data effective to discriminate the product quality is properly selected, and molding conditions for eliminating a molding abnormality are easily determined for an appropriate adjustment of the molding conditions. First and second principal component axes are defined by obtaining correlation coefficients indicating correlations of variations of plural conditions related to an injection molding operation, and performing a principal component analysis. Points representing dispersion of various conditions with respect to each principal component axis, are plotted on a rectangular coordinate system. The characteristic of variation tendency of data of the various conditions is synthetically evaluated on the basis of the first and second principal components which are most affecting the variation of data of the various conditions. The selection of the detected data for discriminating the product quality and the molding conditions to be adjusted is made easy, so that the discrimination of the product quality and adjustment of the molding conditions are simplified.

11 Claims, 8 Drawing Sheets

FIG. 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | · | · | · | · | · | · | · | · | · | · | · | · | · | · | · | · | · | · | · | · | · | · |
| 2 | · | · | · | · | · | · | · | · | · | · | · | · | · | · | · | · | · | · | · | · | · | · |
| 3 | · | · | · | · | · | · | · | · | · | · | · | · | · | · | · | · | · | · | · | · | · | · |
| 4 | · | · | · | · | · | · | · | · | · | · | · | · | · | · | · | · | · | · | · | · | · | · |
| 5 | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| i | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| · | · | · | · | · | · | · | · | · | · | · | · | · | · | · | · | · | · | · | · | · | · | · |
| n | · | · | · | · | · | · | · | · | · | · | · | · | · | · | · | · | · | · | · | · | · | · |

MINIMUM CUSHION QUANTITY

FIG. 6

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|----|---|---|---|---|---|---|---|---|---|----|----|----|----|----|----|----|----|----|----|----|----|----|
| 1  |   | 0.3 | 0.1 | -0.8 | 0.9 | 0.1 | 0.0 | -0.2 | -0.8 | 0.8 | 0.9 | -0.6 | -0.1 | 0.3 | · | · | · | · | · | · | · | · |
| 2  | · |   | · | · | · | · | · | · | · | · | · | · | · | · | · | · | · | · | · | · | · | · |
| 3  | · | · |   | · | · | · | · | · | · | · | · | · | · | · | · | · | · | · | · | · | · | · |
| 4  | · | · | · |   | · | · | · | · | · | · | · | · | · | · | · | · | · | · | · | · | · | · |
| 5  | · | · | · | · |   | · | · | · | · | · | · | · | · | · | · | · | · | · | · | · | · | · |
| 6  | · | · | · | · | · |   | · | · | · | · | · | · | · | · | · | · | · | · | · | · | · | · |
| 7  | · | · | · | · | · | · |   | · | · | · | · | · | · | · | · | · | · | · | · | · | · | · |
| 8  | · | · | · | · | · | · | · |   | · | · | · | · | · | · | · | · | · | · | · | · | · | · |
| 9  | · | · | · | · | · | · | · | · |   | · | · | · | · | · | · | · | · | · | · | · | · | · |
| 10 | · | · | · | · | · | · | · | · | · |   | · | · | · | · | · | · | · | · | · | · | · | · |
| 11 | · | · | · | · | · | · | · | · | · | · |   | · | · | · | · | · | · | · | · | · | · | · |
| 12 | · | · | · | · | · | · | · | · | · | · | · |   | · | · | · | · | · | · | · | · | · | · |
| 13 | · | · | · | · | · | · | · | · | · | · | · | · |   | · | · | · | · | · | · | · | · | · |
| 14 | · | · | · | · | · | · | · | · | · | · | · | · | · |   | · | · | · | · | · | · | · | · |
| 15 | · | · | · | · | · | · | · | · | · | · | · | · | · | · |   | · | · | · | · | · | · | · |
| 16 | · | · | · | · | · | · | · | · | · | · | · | · | · | · | · |   | · | · | · | · | · | · |
| 17 | · | · | · | · | · | · | · | · | · | · | · | · | · | · | · | · |   | · | · | · | · | · |
| 18 | · | · | · | · | · | · | · | · | · | · | · | · | · | · | · | · | · |   | · | · | · | · |
| 19 | · | · | · | · | · | · | · | · | · | · | · | · | · | · | · | · | · | · |   | · | · | · |
| 20 | · | · | · | · | · | · | · | · | · | · | · | · | · | · | · | · | · | · | · |   | · | · |
| 21 | · | · | · | · | · | · | · | · | · | · | · | · | · | · | · | · | · | · | · | · |   | · |
| 22 | · | · | · | · | · | · | · | · | · | · | · | · | · | · | · | · | · | · | · | · | · |   |

METHOD OF ANALYZING FACTORS AFFECTING PRODUCT QUALITY AND ADJUSTING MOLDING CONDITIONS FOR INJECTION MOLDING MACHINE

DESCRIPTION

1. Technical Field

The present invention relates to a method of analyzing factors affecting the quality of products molded by an injection molding machine and to a method of adjusting molding conditions by utilizing the analyzing method.

2. Background Art

It has been customary to detect various data relating to an injection molding operation, such as data in every molding cycle of an injection molding machine including injection time and measuring time, data of a peripheral equipment including resin drying temperature and data of room temperature, to use such data for discriminating the quality of products and as criteria for optimizing the molding conditions.

For a reliable discrimination of the product quality, it is necessary to select the conditions most affecting the product quality from the various data relating to the injection molding operation for comparing data of the selected conditions with data under which conforming products have been obtained.

However, in the conventional product quality analysis, selection of data appropriate for discriminating the product quality has been dependent solely on experience of an operator, and therefore the reliability of the selection is not always guaranteed.

In order to select the molding conditions most closely relating to the product quality, it is necessary to detect the data of several tens or more conditions including the injection time and the measuring time for every molding cycle and graphically displaying those data for respective kinds, and to confirm the relation between the variation of the various conditions and occurrence of nonconforming products as a preliminary operation, and then select the data appropriate for the product conformity. However such selection includes the operator's subjective point of view and thus such data is not always adequate for a proper discrimination. In addition, since several tens or more conditions have to be considered as data for the product conformity, it would take a considerable time only for the preparatory operation before selecting appropriate conditions.

In general, selecting plural kinds of data as material for the discrimination rather than a single kind of data would be considered to improve the accuracy of the discrimination of the product conformity. However, if two kinds of data having similar characteristics are selected, the discriminating accuracy is not always improved. For example, in a case where variation of one data is dependent on variation of another data, detecting either of the data would suffice. For a stricter discrimination, it is necessary to select data of the other conditions which are independent of these two data and affecting the product quality.

However, since various conditions relating to the injection molding operation vary in complex correlation, it is extremely difficult to select plural kinds of data useful for the discrimination as long as analysis is made by individually referring to variation of data of the various conditions, especially when the operator's experience is inadequate.

As is apparent from the foregoing points of view, in the conventional discrimination of the product quality, only the relation between the product quality and the individual variation of the data of each condition is considered in order to select the data for the discrimination of the product conformity, and hence the effects of the relations among various conditions on the product quality are not adequately considered. Therefore, it is difficult to properly select the data useful for the discrimination of the product conformity and the result of the discrimination has less reliability.

Furthermore, according to the conventional method, the problems similar to those described above would be caused in adjusting the molding conditions when a molding abnormality is detected. The molding abnormality is detected as an abnormality in variation of data of individual conditions. As a matter of course, in order to eliminate the abnormality once occurred, it is necessary to adjust some of adjustable conditions on the various conditions relating to injection molding operation and finally to restrain the abnormality of variation within the tolerance thereof. However, according to the above conventional method, there is a problem that it is hard to know which molding condition should be adjusted among a number of molding conditions.

For instance, the abnormality would be detected in cases where the injection time exceeds the tolerance or where the temperature of an injection cylinder is lowered to increase the viscosity resistance of molten resin or where a screw is hindered from moving to a preset position due to an excessive measuring to increase the injection time. As already mentioned, since the various conditions relating to the injection molding operation vary in complicated correlation, it is hard to precisely grasp the causes of the abnormality. With respect to the above-mentioned example of the injection time, it might be possible to restrain the injection time within the tolerance by raising the preset value of the injection pressure to increase the moving speed of the screw. Generally, however, such a shortcut operation is not appropriate for solving the problem. In particular, such unrational operation of increasing the injection pressure may cause unnecessary and significant changes in the data of other conditions. The inappropriate operation is derived from the fact that molding conditions are evaluated only in view of variation of data of the individual condition without considering the relationship of various conditions and the effects of the relationship on the product quality.

As is manifest from the above, in the conventional method, if there is an abnormality in data of any one condition, it is not easy to determine the molding conditions to be adjusted to eliminate the abnormality. Consequently, it was often the case that inappropriate adjustment of conditions aggravate the situation.

DISCLOSURE OF INVENTION

An object of the present invention is to provide a method of analyzing factors affecting the quality of products molded by an injection molding machine, in which data useful in discriminating the product quality can be precisely selected and in which molding conditions for eliminating any molding abnormality can easily be judged for an appropriate adjustment.

In this invention, data of various conditions, such as injection time, measuring time and room temperature, relating to the injection molding operation are detected for each predetermined molding cycle, and the detected data are stored as data columns for respective conditions. Then a multivariate analysis, such as a primary component analysis, a cluster analysis and a factor analysis, for dividing the various conditions into related groups is executed based on stored data columns, and then the conditions analogous in characteristic of variation of the data columns are grouped to analyze possible factors affecting the quality of products. Particularly in the case of primary component analysis, a correlation matrix is created by obtaining, based on stored data columns, all the correlation coefficients representing correlation in variation of the data of different conditions, and then eigen vectors of two primary components (the first primary component and the second primary component) for each of the various conditions are obtained by performing the primary component analysis on the correlation matrix to plot the points representing the various conditions with the eigen vectors of the two primary components on each orthogonal axis.

In selecting the condition to be regarded as data for product quality discrimination, the points plotted close to one another are grouped, and then one of the plural conditions belonging to the same group is selected from one or more groups as data for discriminating the product quality. Since each of those data belonging to the same group is similar in variation characteristic to the rest of those data in the same group, it is enough to select only one condition from the conditions of the same group to avoid the waste of time. Those data belonging to the same group are analogous to one another in terms of variation characteristics but differ from one another in terms of the degree of variation due to the kind of the condition, so that it is advantageous for the product quality discrimination to select the data which has large variation. The magnitude of variation of the data can be found easily by comparison of data columns of the various conditions. The group and the number of conditions to be selected are determined depending on the required discrimination accuracy. The data selected in this way are not dependent one another, and such combination of these data is optimum as data for the product quality discrimination.

Further, in adjusting the molding conditions by utilizing the above-mentioned analysis of factors affecting the product quality, data of one condition is stabilized so that data of other conditions are stabilized in the same group. Since each data has a variation characteristic analogous to those of other data in the same group as already mentioned, it can be presumed that if one data is stabilized, all other data in the same group can also be stabilized. Thus, even when the condition for discriminating the conformity or nonconformity of the products relates to such kind of data that is not appropriate for searching the cause of abnormality, if another condition by which the cause of abnormality can easily be searched is included in the same group, it is possible to remove the cause of abnormality by adjusting the molding conditions for the adjustment of such other condition.

If there is any other group in origin symmetry on the rectangular coordinate system with the group containing the data on which the abnormality has been detected, it means that the condition in the group of the origin symmetry has a negative correlation with the group containing the condition on which the abnormality has been detected. Therefore, if the molding condition for adjusting at least one condition included in the group of the origin symmetry is found, it is likewise possible to eliminate the molding abnormality by adjusting such molding condition.

Further, each time when molding conditions relating to an injection molding operation are adjusted, data of the various conditions are detected and stored as data columns for respective conditions, and the points corresponding to those various conditions are plotted. The molding conditions are adjusted until the points are grouped in the vicinity of the origin of the rectangular coordinate system or until the standard deviation or the value obtained by dividing the standard deviation by the mean value for all the conditions or a particular condition becomes smaller than a set value or until the rate of contribution of all primary components or a particular primary component converges below a set value to converge the conditions.

BRIEF DESCRIPTION OF DRAWINGS

FIG. 2 is a diagram schematically showing an example of a data file provided in the arithmetic unit;

FIG. 6 is an example of a correlation matrix derived from the data file;

BEST MODE FOR CARRYING OUT THE INVENTION

According to the present invention, a number of conditions affecting quality of products molded by an injection molding machine are divided into groups which have similar effects on the product quality to analyze the factors affecting the product quality, by utilizing a multivariate analysis, and further the molding conditions are adjusted based on the result of the analysis. The following description is made on a preferred embodiment in which factors affecting the product quality are analyzed by a method of primary component analysis in the multivariate analysis, and the molding conditions are adjusted based on the result of the analysis.

Figure 1:
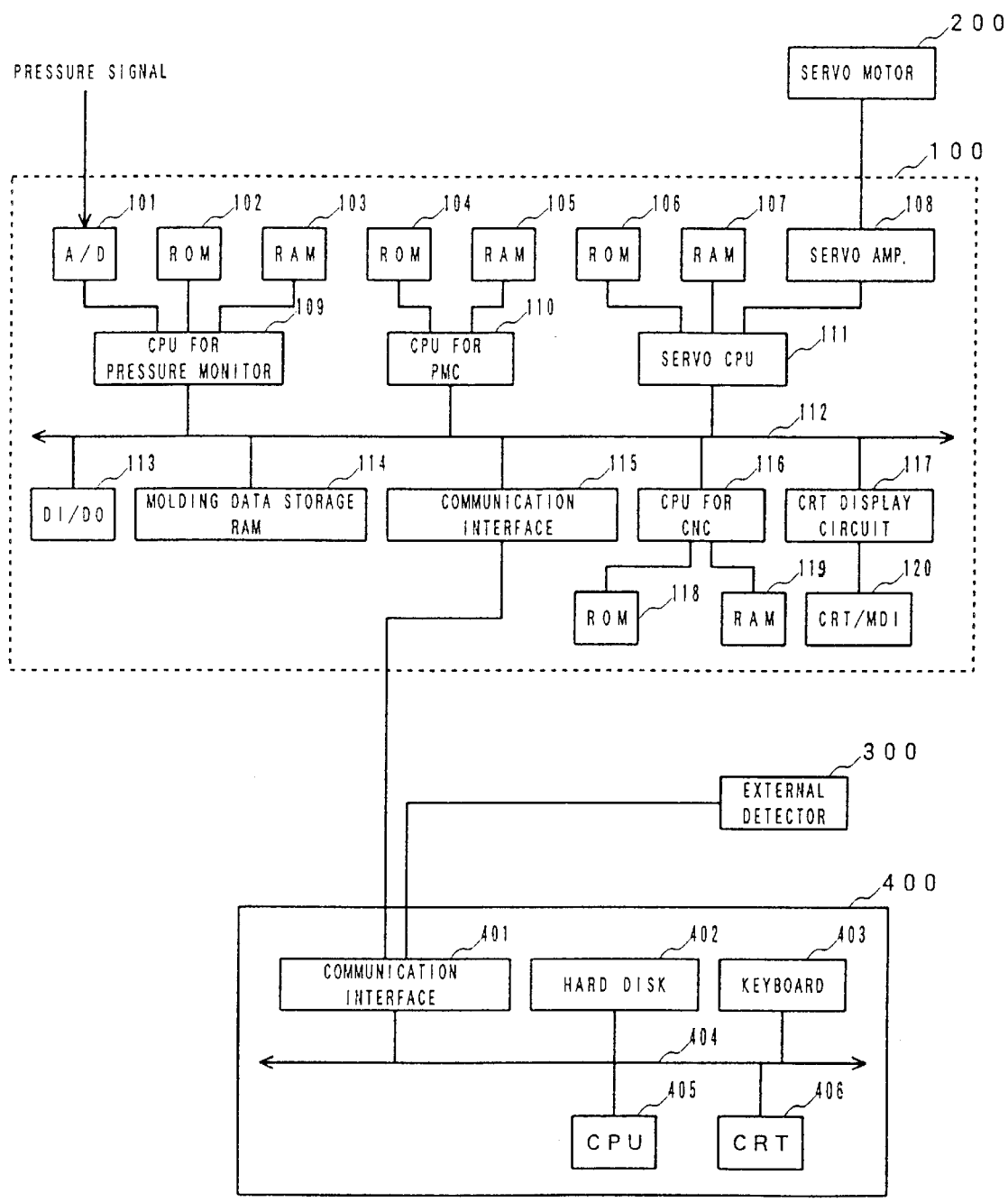
FIG. 1 is a block diagram showing a main part of a controller for controlling an injection molding machine and an arithmetic unit connected to the controller for carrying out the method of the present invention.

FIG. 1 is a block diagram showing a main part of a controller 100 for drivingly controlling an injection molding machine and an arithmetic unit 400 connected to the controller 400, for carrying out the method of analyzing factors affecting the product quality and adjusting the molding conditions according to the present invention. The injection molding machine in this embodiment is an ordinary electric-powered injection molding machine in which a clamping shaft, a screw rotating shaft, an ejector shaft and an injection shaft are driven by servo motors. As hardware structure of this type of injection molding machine is well known in the art, the description regarding the structure is omitted here.

The controller 100 for drivingly controlling the injection molding machine has a CPU 116 for CNC as a microprocessor for numerical control, a CPU 110 for PMC as a microprocessor for programmable machine control, a servo CPU 111 as a microprocessor for servo control and a CPU 109 for pressure monitoring, wherein information can be transferred among the individual microprocessors by selecting mutual input and output via a bus 112.

A ROM 104 which stores a sequence program for controlling the sequential operation of the injection molding machine, etc. and a RAM 105 for temporarily storage of arithmetic data are connected to the CPU 110 for PMC. A ROM 118 which stores a program for generally controlling the injection molding machine and a RAM 119 for temporary storage of arithmetic data are connected to the CPU 116 for CNC.

Further, a ROM 106 which stores a control program dedicated for servo control, a RAM 107 for temporary storage of data, a ROM 102 which stores a control program for sampling processing of pressure data and a RAM 103 for temporary storage of data are connected to the servo CPU 111 and the pressure monitor CPU 109, respectively. The servo CPU 111 is connected to servo amplifiers for driving servo motors of individual shafts for clamping, injection, screw rotation and ejector in the injection molding machine based on commands from the CPU 111. In FIG. 1, only one servo motor 200 and one servo amplifier 108 for driving the servo motor 200 are shown. An output of a pulse coder provided on the servo motor 200 for each axis is fed back to the servo CPU 111, and current position and moving speed of each axis, which are calculated by the servo CPU 111 based on the feedback pulses from the pulse coder, are successively updated and stored in a current position storing register and a current speed storing register, respectively, in the RAM 109.

The CPU 109 for pressure monitor performs sampling processing for the injection dwell pressure and the back pressure of the screw during injection molding via the analog-to-digital converter 101 and an unillustrated pressure detector provided on the injection molding machine.

Further, an input/output circuit 113 is provided for receiving signals from limit switches arranged at various parts of the injection molding machine and an operation panel and for transmitting various commands to peripheral equipment of the injection molding machine. A manual data input device 120 with a display is connected to the bus 112 via a CRT display circuit 117 for selecting a monitor display and a function menu, and for inputting various data through numeral keys for inputting numeral data and various function keys.

A nonvolatile memory 114 is provided as a molding-data-storage memory for storing set values of various molding conditions concerning an injection molding operation, such as an injection speed, a position of switching an injection dwell pressure, the injection dwell pressure, the number of rotation of the screw for measuring and kneading, and temperatures of nozzle and various parts of an injection cylinder, i.e., conditions that are positively controllable of the conditions concerning the injection molding operation, and also various parameters and macro variables, etc.

With the above arrangements the CPU 110 for PMC sequentially controls the general operation of the injection molding machine based on a sequence program in the ROM 104, while the CPU 116 for CNC distributes pulses for the servo motors of the individual axes based on the control program in the ROM 118 and the molding conditions in the nonvolatile memory 114. The servo CPU 111 performs the servo control including a position loop control, a speed loop control and a current loop control based on the move command pulses distributed for the individual axes, and position and speed feedback signals detected by a detector such as a pulse coder in the same manner as in the conventional art to thereby execute a so-called digital servo processing as a whole.

Data of a peak injection pressure detected by the aforesaid pressure detector during the actual injection molding operations, data of a minimum cushion quantity, a measuring completion position and a switching position of the injection dwell pressure, which are derived by the feedback signals from the pulse coder of the servo motor 200 for each axis, and data of temperatures of nozzle, various portions of an injection cylinder and a lower portion of a hopper, which are detected by thermoelectric couples mounted on the injection molding machine, and data of a cycle time, an injection time and a measuring time, which are measured by a timer provided in the controller 10, are transmitted to the arithmetic unit 400 via a communication interface 115 for every molding cycle of the continuous molding operation, as a part of detected data of the various conditions relating to the injection molding operation. The detecting procedures of data of the peak injection pressure, the minimum cushion quantity, the measuring completion position, the injection dwell pressure switching position, temperatures of the nozzle and various parts of the cylinder, the cycle time, the injection time and the measuring time, etc. are known from Japanese Patent Laid-Open Publications Nos. Hei 6-155540 and Hei 6-170907, and therefore their descriptions are omitted here.

The arithmetic unit 400 is an ordinary personal computer comprising a microprocessor 405, a hard disk 402, a keyboard 403, a display unit 406 and a bus 404 for connecting these components to one another, and receives the aforesaid various kinds of data being transmitted from the controller 100 via a communication interface 401 and sequentially stores the received data in a data file of the hard disc 402. Further, the arithmetic unit 400 receives data from external detectors 300 including a thermometer for room temperature, in synchronism with receipt of the data from the controller, and stores the received data in the data file for each molding cycle. The data from the external detectors 300 constitutes a part of various conditions relating to the injection molding operation.

In the various conditions relating to the injection molding operation, some conditions such as the injection speed, the injection dwell pressure switching position, the injection dwell pressure, the number of rotations of the screw for measuring/kneading and temperatures of the nozzle and various portions of the injection cylinder are detected in the injection molding machine, while the other conditions such as the room temperature are detected by the external detectors 300. Further, part of the conditions relating to injection molding operations, such as the injection speed, the injection dwell pressure switching position, the injection dwell pressure, the number of speed of the screw for measuring/kneading and the temperatures of the nozzle and various portions of the cylinder can be adjusted by modifying the setting of the molding conditions stored in the nonvolatile memory 114. The injection speed, the injection dwell pressure switching position, the injection dwell pressure, the number of screw rotations for measuring/kneading, and temperatures of the nozzle and various portions of the injection cylinder are doubly defined as the molding conditions and the various conditions. The term molding conditions refers to set values in the nonvolatile memory 114, while various conditions refers to the data actually detected by the pressure detector and the thermoelectric couples.

Figure 2:
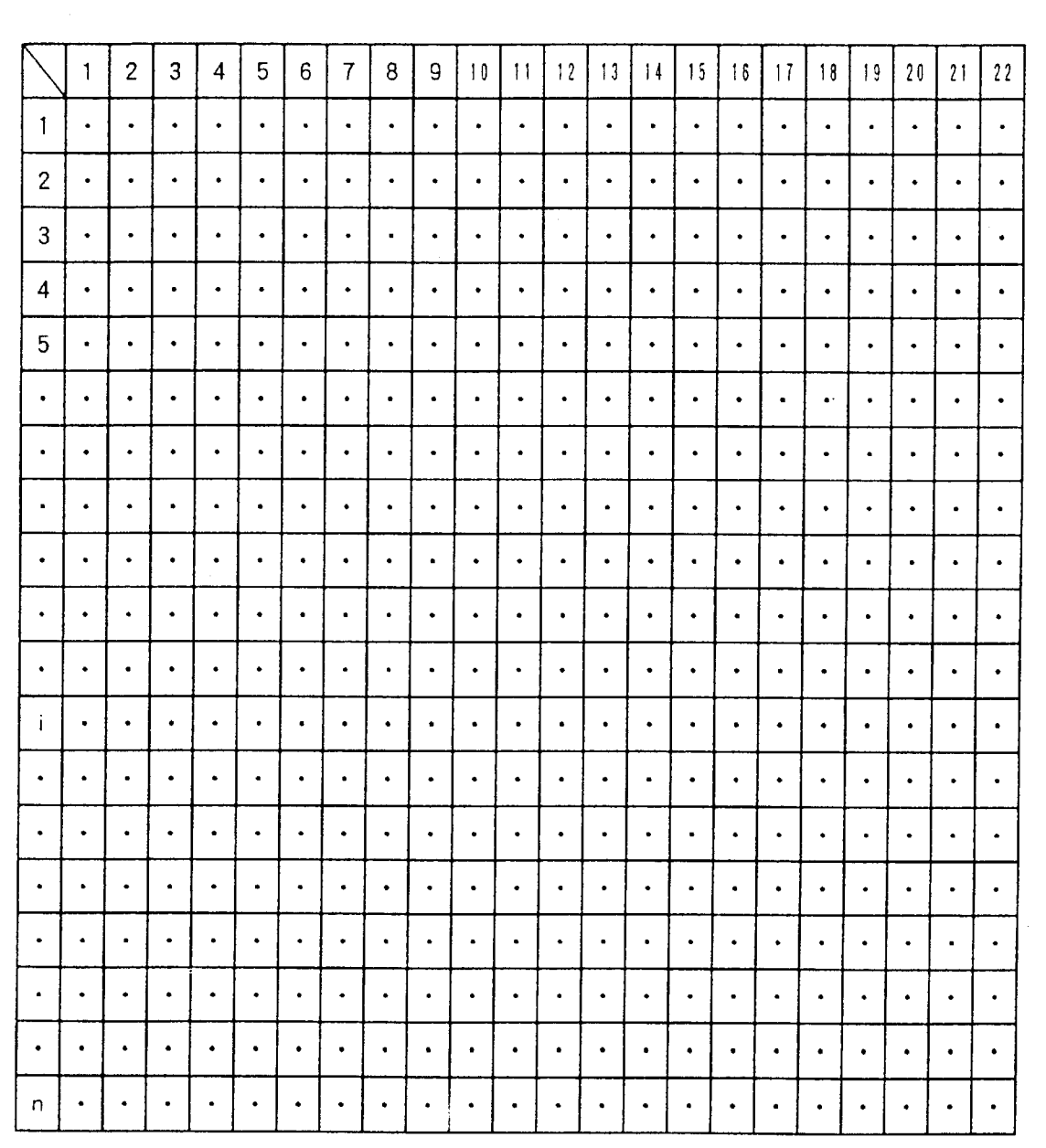

In this embodiment, the total number of the actually detectable conditions is 22, including conditions to be detected by the detectors provided in the injection molding machine and conditions to be detected by the external detectors 300, and the data file containing all the conditions is created in the hard disk 402 of the arithmetic unit 400. FIG. 2 is a schematic diagram showing an example of the data file. Numbers 1–22 in the row respectively indicate addresses for names of the various conditions; for example, condition "1" is assigned to the cycle time, condition "2" is assigned to the injection time, condition "3" is assigned to the counting time, condition "4" is assigned to the minimum cushion quantity, condition "5" is assigned to the measuring completion position, . . . , condition "13" is assigned to the temperature of intermediate portion of the cylinder, . . . , and condition "22" is assigned to the room temperature. On the other hand, numbers 1-n in the column indicate the addresses for the numbers of shot from a start of sampling. In this data file, the data of various conditions detected in every molding cycle (every shot) by the detectors in the injection molding machine and by the external detectors 300 are sequentially stored as a data row for every molding cycle.

Figure 3:
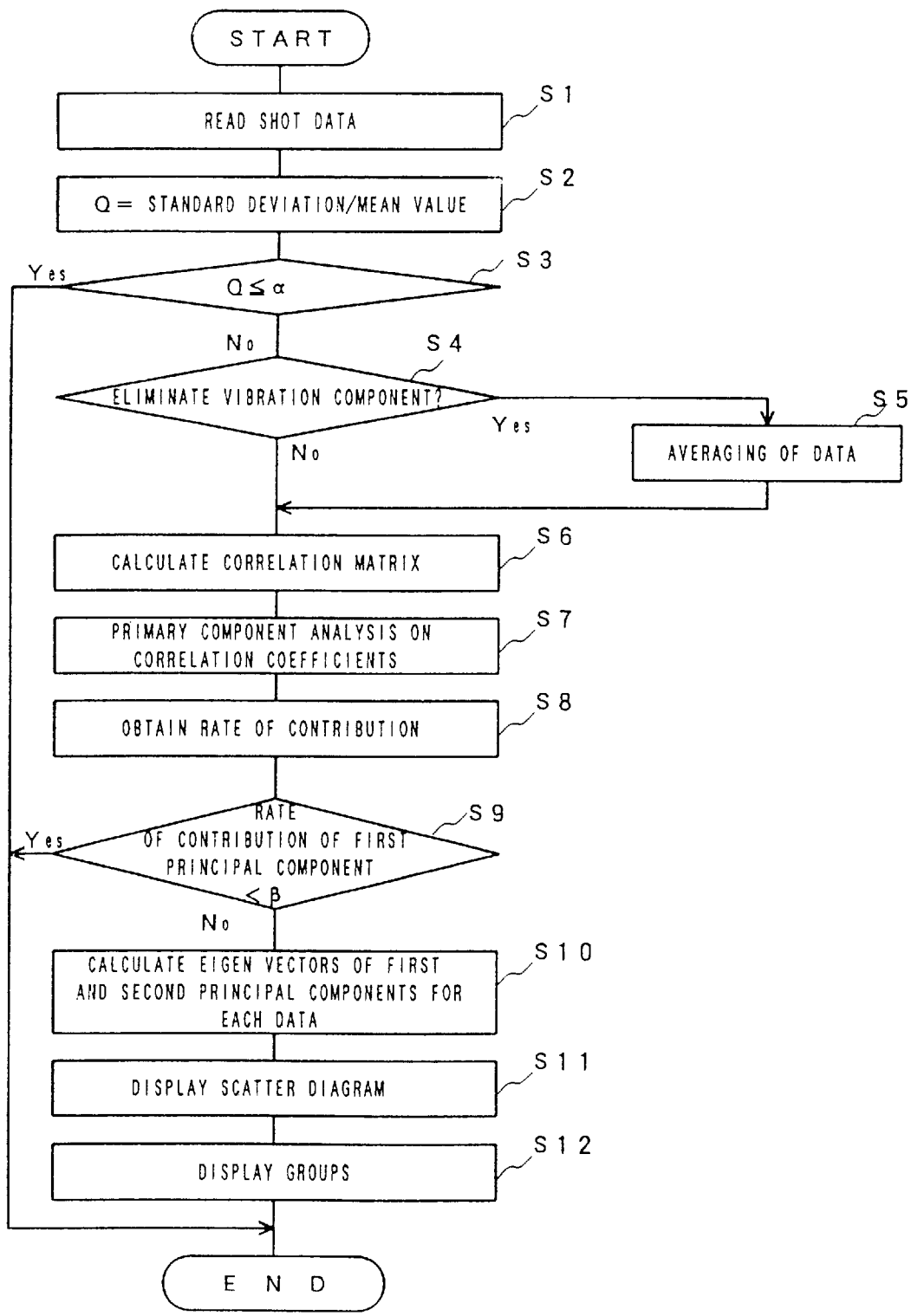
FIG. 3 is a flowchart showing a scatter diagram creation process by the arithmetic unit.

Hereinafter, the principle of the product quality analyzing and molding condition adjusting method, and the operation of the arithmetic unit 400 will be described according to one embodiment with reference to the flowchart of FIG. 3, assuming that the detected data of the various conditions as shown in FIG. 2 have been already stored in the hard disk 402. The flowchart of FIG. 3 shows a process of creating a scatter diagram for easily grasping correlations of variation characteristics of the detected data of various conditions, and a program therefor is previously stored in the hard disk 402.

When a scatter-diagram-creating processing is started, the microprocessor 405 first reads data in the data file and temporarily stores the read data in a work area of the hard disk 402 (step S1), and then derives a standard deviation and a mean value of every condition as well as a value Q determined by dividing the standard deviation by the mean value (step S2). The microprocessor 405 discriminates whether or not the value Q of each condition is less than or equal to a set evaluation value α, i.e., variation of each condition is reduced to converge (step S3). The microprocessor 405 terminates the analysis process using the scatter diagram if the value Q for every condition is less than or equal to the set value α. Instead of obtaining the value Q by dividing the standard deviation by the mean value for every condition, the value Q may be obtained only for some preselected conditions and the discrimination of step S3 may be performed only for such preselected conditions. In this embodiment, whether the variation of each condition is converged or not is determined based on the value Q obtained by dividing the standard deviation by the mean value. Alternatively, only the standard deviation of each condition is obtained and whether or not the variation of each condition is converged may be discriminated based on whether or not the standard deviation is smaller than a set value.

If one of the values Q for all the conditions or the selected conditions is greater than the set evaluation value α, it is determined whether or not a command of vibration component elimination is set (step S4), and only when the command of vibration component elimination is set, a data averaging process of step S5 is executed to update the data file in the work area. The vibration-component-elimination command can be manually set and canceled in the arithmetic unit 400 by an operator through keyboard 403, before starting the scatter diagram creating process.

Figure 4:
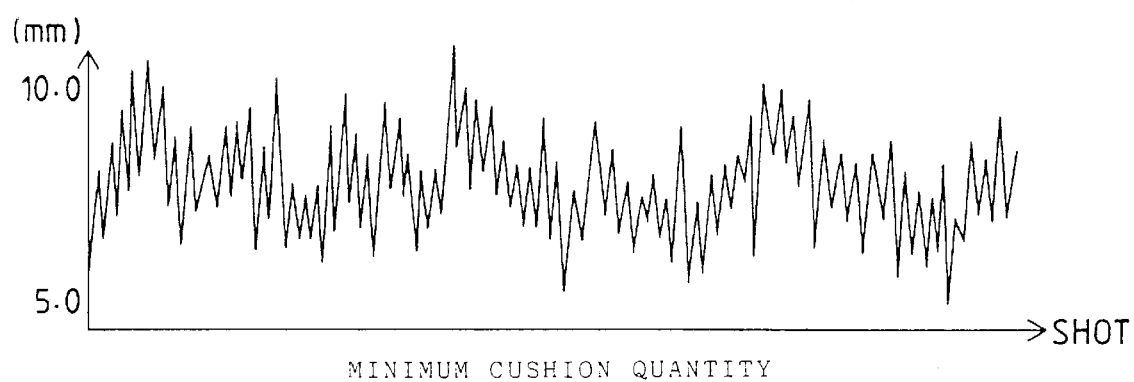
FIG. 4 is an example of a graphic display of a series of data having large vibration.

The data averaging process of step 5 is a process of smoothing data which is effective in determining the correlations of such data column of the condition that contains many vibration components to have a nonnegligible dispersion when each datum in one molding cycle is compared with another datum in another molding cycle, although the data has a certain pattern of variation as a whole in terms of time series, with the data column of other various conditions. FIG. 4 shows a sampling data of the minimum cushion quantity as an example of the condition containing vibration components. In FIG. 4, the axis of abscissa represents the number of shots, i.e., an address of the shot number in the data file as shown in FIG. 2, while the ordinate axis represents data value in every shot (molding cycle). The averaging process is necessary as there is a possibility that a correlation coefficient accurately representing correlation between the data columns is not obtained by comparing the data column of the condition, which contains many vibration components such as the minimum cushion quantity with the data column of other various conditions or by comparing the data columns of the conditions having many vibration components with each other.

The simplest method of averaging data is to successively read M units of data from the beginning of shot-number address in the data file shown in FIG. 2 and to obtain an average of each section by dividing a sum of the read data by M, the average being treated as a representative value for that section. More specifically, in the above method the representative value is stored in each address in the corresponding section in the data file, or in the alternative way the same processing is applied to all other data columns, irrespective of degree of presence of the vibration components so as to compress the whole sampling data to a capacity of 1/M.

For example, with respect to a particular condition, when the data m1, m2, m3, m4, m5, m6 of the shot-number addresses 1–6 in the data file are to be smoothed with M=3, a value of (m1+m2+m3)/3 is stored in each data area of shot-number addresses 1–3 and a value of (m4+m5+m6)/3 is stored in each of data area of shot-number addresses 4–6 of the data file according to the former way. According to the latter way, a value of (m1+m2+m3)/3 is stored only in the data area of shot-number address 1 and a value of (m4+m5+m6)/3 is stored in the data area of short-number address 2 of the data file, to thereby compress the whole data column to 2/6=1/3=1/M. In order to prevent a difference of the number of data between the compressed data column and other data column, the same process is applied to all the other data columns, thereby compressing the other data columns at the same ratio in the latter way. In the latter way, the number n of the initial data is not always divisible by M without a remainder. If n/M produces a remainder, the data corresponding to the remainder is neglected. For example, 1 is produced as a remainder when n=7 and M=3. In this case, the seventh data is neglected and only the remaining six data are subjected to the above-described process of compressing the data. At the same time, the value of total sampling number n is updated to INT (n/M) (where INT is obtained by an integrating process by rounding down a decimal part), in response to the change of data number due to the data compression.

Figure 5:
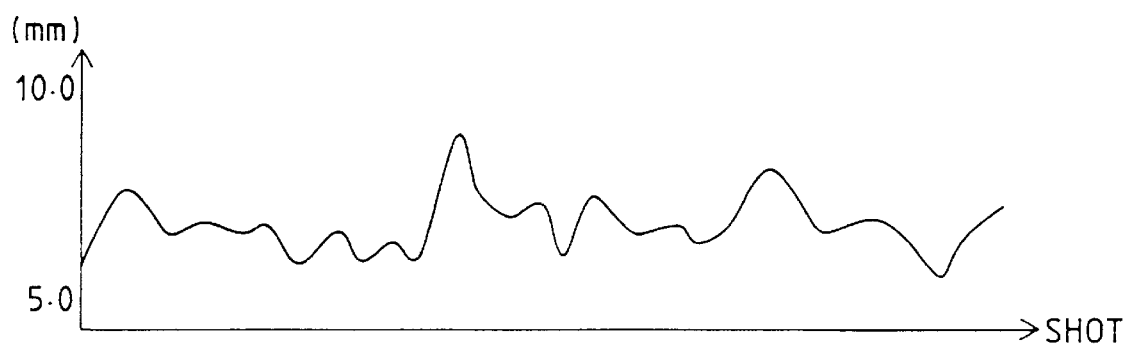
FIG. 5 is an example of a graphic display of the series of data in which the vibration is eliminated.

In an alternative data averaging method, a free curve passing the center of vibration of data having fluctuations (FIG. 4) is created (FIG. 5), and a value of data corresponding to each shot is obtained from a function of the free curve, and is stored in each data area of the shot-number addresses of the data file. In this method, it is unlikely that the inherent information in each data is lost due to the data compression, although the process will be complex.

When the discrimination processing of step S4 or the data averaging process of step S5 is completed, the microprocessor 405 successively reads a pair of data columns of various conditions currently stored in the work area of hard disk 402 and derives the correlation coefficient r for each of all the combinations to obtain a file of correlation coefficients, i.e., a correlation matrix, as shown in FIG. 6 (step S6). In this embodiment, since the number of various conditions to be detected (number of data columns) is 22, the number of correlation coefficients r to be derived is (22×22−22)/2=231 in total. As the coefficient of correlation between a condition "x" and the condition "x", i.e., the coefficients on a diagonal line in FIG. 6, need not be derived, the total number of combinations is 462 (22×2222). Further, as the coefficient of correlation between a condition "y" and the condition "x" is identical with the coefficient of correlation between the condition "x" and the condition "Y", the number of correlation coefficients r to be actually derived by arithmetic processing is 462/2, i.e., 231 in the upper or lower portion with respect to the diagonal line in FIG. 6. As is well known in the art, the correlation coefficient r can be obtained by the following formula (1).

$$r = \frac{\sum_{i=1}^{n}(xi - \bar{x})(yi - \bar{y})}{(n-1)SxSy} \quad (1)$$

where n: the number of data common to each data column xi: i-th data in the data column of condition "x"

$\bar{x}$: mean value of data in the data column of condition "x"

Sx: sampling standard deviation of the data column of condition "x"

yi: i-th data in the data column of condition "y"

$\bar{y}$: mean value of data in the data column of condition "y"

Sy: sampling standard deviation of the data column of condition "y".

Thus, the correlation coefficient is obtained using the data (having mean value of 0 and standard deviation of 1) standardized by subtracting the mean value from each data and then dividing the result by the standard deviation, thereby an appropriate correlation coefficient representing the mutual variation characteristics is obtained even when there is a difference of dimension such as pressure, distance, time, etc. between the individual data columns. As already mentioned, the number of correlation coefficients r to be actually obtained by the arithmetic processing is 231. However, all of the 462 data are stored at individual positions of the file of the correlation matrix as shown in FIG. 6.

Figure 7:
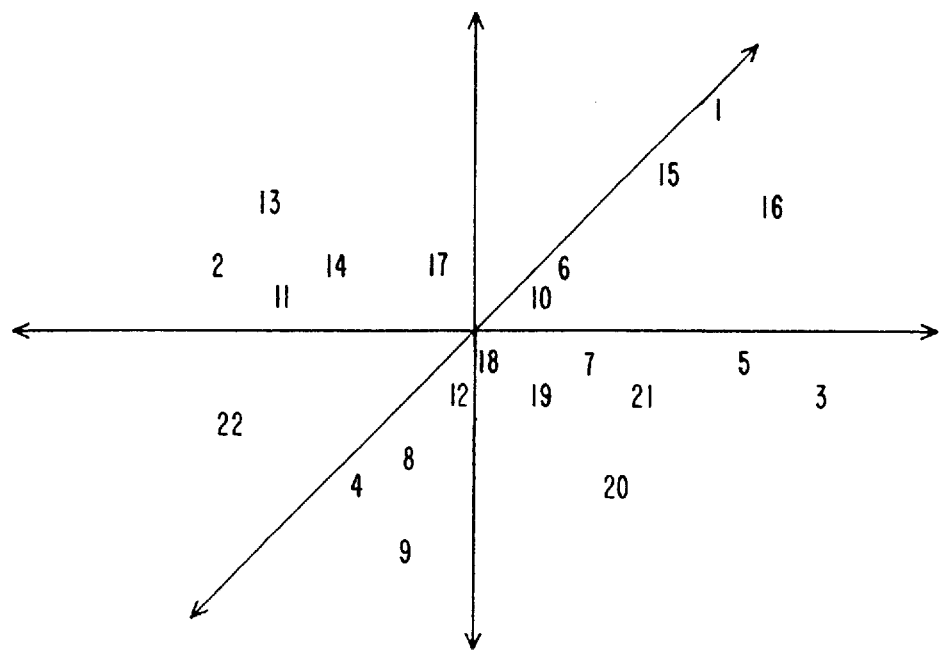
FIG. 7 is a schematic diagram to show plotting of points representing various conditions so that highly correlative conditions are located closer to one another and the lowly correlative conditions are located less close to one another based on the correlation matrix.

FIG. 7 is a schematic diagram to show plotting of points representing various conditions so that highly correlative conditions are located closer to one another and the lowly correlative conditions are located less close to one another based on the correlation matrix of FIG. 6, i.e., that the distances between the plotted points of various conditions are inversely proportional to the correlation coefficient r. For example, a point ① represents the cycle time of condition "1", and a point ② represents the injection time of condition "2", and so forth. Thus, the correlations among various conditions are expected to be readily understandable from FIG. 7. Actually, however, it is impossible for a human being not only to visually recognize the correlation but also to plot the correlation in such a case where the number of conditions exceeds 3 as in this case where the space comprises 22 dimensional arrangements corresponding to the number of conditions. Consequently, it is required to compress this multi-dimensional data into at least three-dimensional data, preferably two-dimensional data, so that the data can be easily and visually recognized by a method in which a loss of information is small.

Figure 8:
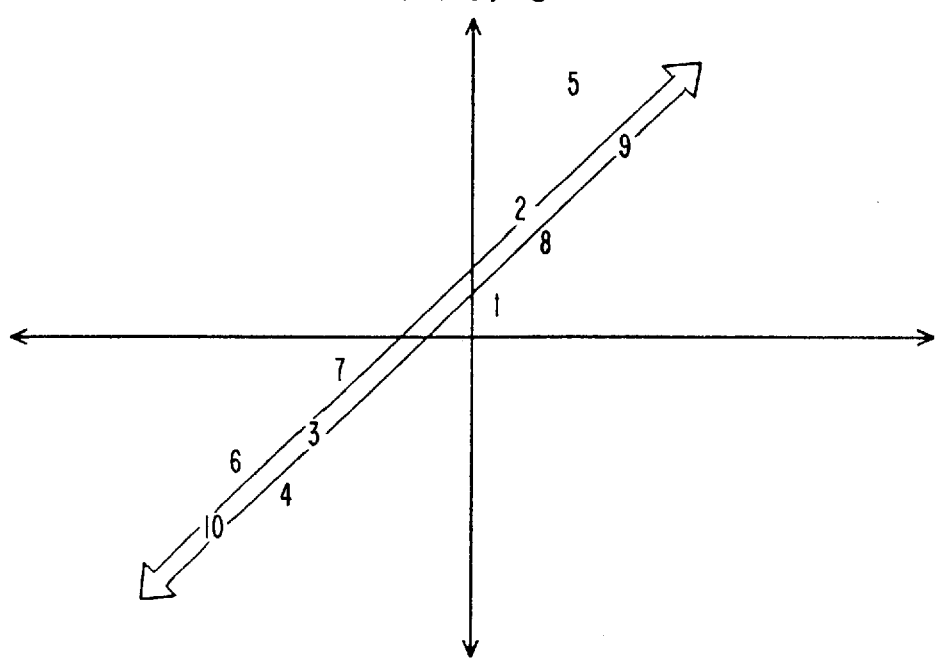
FIG. 8 is a diagram showing an example of dispersion of the correlation.
Figure 9:
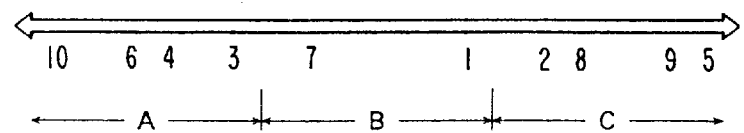
FIG. 9 is a schematic diagram showing the relation between dispersion of correlation and factors causing the dispersion.

Further studying the case, if dispersion of the points representing the various conditions has a particular directivity as shown in FIG. 8, it is presumable that the dispersion of the points is caused by some unidentified factor. By dividing the dispersion into sections A, B and C along aforesaid specific direction, as shown in FIG. 9, it is estimated that some conditions (in the section A) are affected in a negative direction by the factor, some other conditions (in the section C) are affected in a positive direction by the factor, and the remaining conditions (in the section B) are scarcely affected by the factor in either direction.

In order to find the factor affecting such scattering, the following process of the principal component analysis is performed. Contribution rates of 1st to 22nd principal components in descending order of magnitude of variance (or contribution rate), having the same number as that of the molding conditions (22 in this example), are obtained (steps S7 and S8). The contribution rate is obtained by dividing a variance of each principal component by the sum of the variances of all the principal components (1st to 22nd principal components). It is determined whether or not the contribution rate C1 of the first principal component having the largest contribution rate is smaller than a set value β (e.g. approximately 0.1), to determine whether or not the contribution rates are uniform (step S9). If the contribution rate C1 of the first principal component is smaller than the set value β to be made uniform, this analyzing process is terminated. Alternatively, especially in the stage where adjusting of the molding conditions has been advanced, a particular principal component is designated and the target value of contribution rate thereof is set in advance, and the analysis process may be terminated when the contribution rate of the designated principal component has become smaller than the target value without using the contribution rate of the first principal component.

Then, if the contribution rate of the first principal component is larger than the set value β, an eigen vector of the first and second principal components is obtained (step S10). The eigen vector, representing the magnitude and direction of the principal component, is normalized so that its magnitude becomes "1" and serves as a unit vector of a new coordinate system to be established by the principal components. Further, the eigen vector represents a numeral value of an effect of each condition (data) on the principal component. The effects of all conditions on the first principal component A through 22nd principal component V are expressed by the following formula (2).

$$A = a_1① + b_1② + c_1③ + \ldots + V_1㉒$$

$$B = a_2① + b_2② + c_2③ + \ldots + V_2㉒$$

$$C = a_3① + b_3② + c_3③ + \ldots + V_3㉒$$

$$V = a_{22}① + b_{22}② + c_{22}③ + \ldots + V_{22}㉒$$

A through V are independent of each other, and $$a_1^2+b_1^2+c_1^2+\ldots+V_1^2=1$$
$$a_2^2+b_2^2+c_2^2+\ldots+V_2^2=1$$
$$a_3^2+b_3^2+c_3^2+\ldots+V_3^2=1$$
$$a_{22}^2+b_{22}^2+c_{22}^2+\ldots+V_{22}^2=1 \qquad (2)$$

Figure 10:
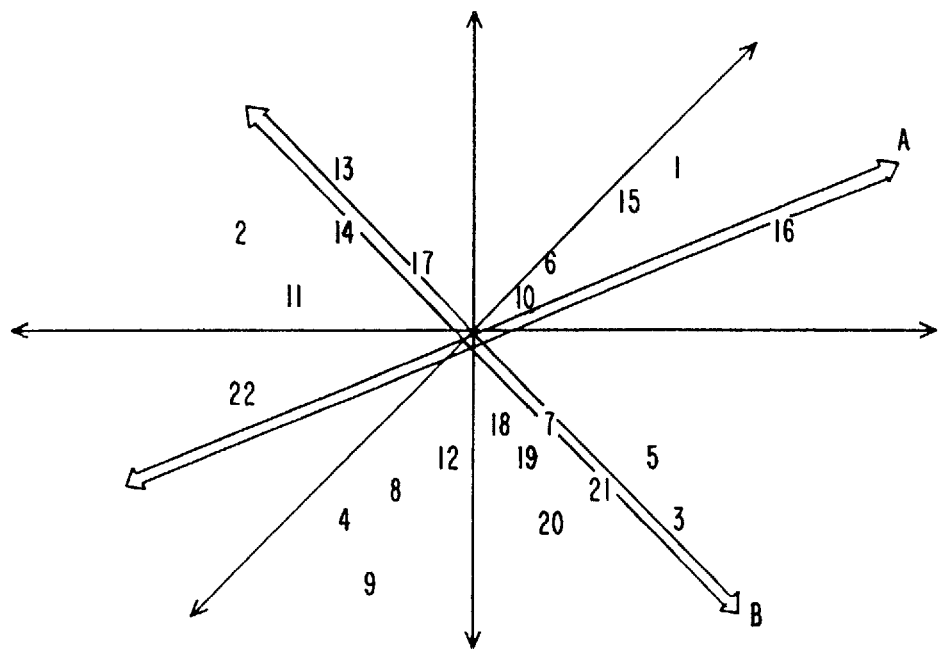
FIG. 10 is a schematic diagram showing an example of axes of first and second primary components.

In the formula (2), circled numbers such as 1 correspond to data (correlation coefficients) of conditions in each column of the correlation matrix of FIG. 6, and $a_1-V_1$, $a_2-V_2$, $a_3-V_3$, . . . , $a_{22}-V_{22}$ are eigen vectors of the individual conditions with respect to the respective principal components. Applying the principal component analysis to scattering of the data imaged in FIG. 7, the first and second principal components A and B can be established as shown in FIG. 10.

In this embodiment, a scatter diagram is obtained based on the first principal component (the first factor) A and the second principal component (the second factor) B. In step S10, the eigen vectors $a_1$, $b_1$, $c_1$, . . . $V_1$ of the individual conditions with respect to the first principal component and the eigen vectors $a_2$, $b_2$. $c_2$. . . . $V_2$ of the individual conditions with respect to the second principal component are obtained. A rectangular coordinate system, with the first principal component as axis of abscissa and with the second principal component as axis of ordinate, is displayed on the display unit 406 and the points representing the individual conditions are plotted on the rectangular coordinate system (step S11). Thus, with regard to the cycle time of condition "1", ① is plotted at a position having a value $a_1$ on the first principal component axis and a value $a_2$ on the second principal component axis. Likewise, with regard to the injection time of condition "2", ② is plotted at a position having a value be on the first principal component axis and a value $b_2$ on the second principal component axis, thereby obtaining the scatter diagram as shown in FIG. 11.

Figure 11:
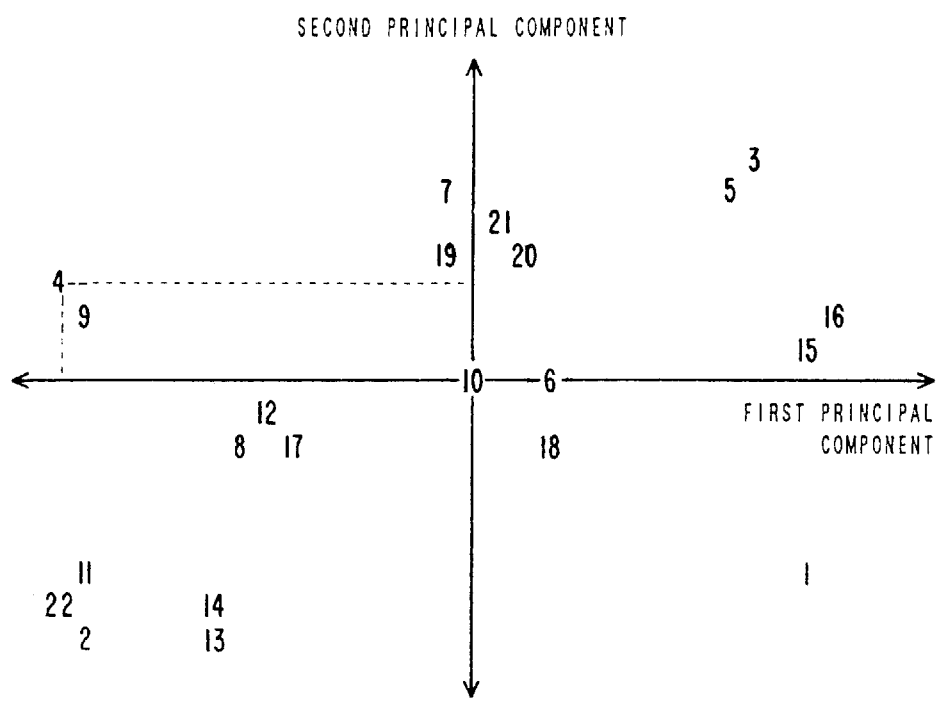
FIG. 11 is a scatter diagram with a horizontal axis of the first primary component and a vertical axis of the second primary component.

The scatter diagram of FIG. 11 obtained in this way shows the scattering state by expanding the scatter direction of one dimension as shown FIGS. 8 and 9 to two dimension. Thus, in FIG. 11, the conditions located on the right side of the origin of the rectangular coordinate system, e.g. conditions "15", "16", etc., are strongly affected in a positive direction by the first principal component (corresponding to the section C of FIG. 9); the conditions located on the left side of the origin, e.g. conditions "4", "22", etc., are strongly affected in a negative direction by the first principal component (corresponding to the section A of FIG. 9); and the conditions located near the origin in the direction of the first principal component axis, e.g. conditions "10", "19", "21", etc., are scarcely affected by the first principal component (corresponding to the section B of FIG. 9). Likewise, in FIG. 11, the conditions located on the upper side of the origin, e.g. conditions "7", "9", etc., are strongly affected in a positive direction by the second principal component (corresponding to the section C of FIG. 9); conditions located on the lower side of the origin, e.g. conditions "2", "13", etc., are strongly affected by the second principal component in a negative direction (corresponding to the section A of FIG. 9); and the conditions located near the origin in the direction of the second principal component axis, e.g. conditions "10", "6", etc., are scarcely affected by the second principal component (corresponding to the section B of FIG. 9).

As a matter of course, if the dispersion is displayed on a thee-dimensional rectangular coordinate system having a third principal component axis using the eigen vectors $a_3$, $b_3$, $c_3$, . . . , $v_3$ of the third principal component, the accuracy of information (contribution rate) showing the dispersion can be improved, but it is hard for an operator to grasp the three-dimensional information plotted in the display unit 406. Thus, in this embodiment, such three-dimensional display is not employed. It is technically easy to constitute a two-dimensional rectangular coordinate system by two arbitrary axes selected from the 1st through 22nd principal component axes to display a picture such as shown in FIG. 11. From a viewpoint of information accuracy, however, it is preferable to select the most influential first and second principal component axes for bases of display. Even if other two axes are to be selected for the display processing, it is necessary to leave at least the first and second principal component axes selectable.

As is manifest from the foregoing description, in the scatter diagram of FIG. 11, those points plotted close to one another represent conditions having substantially the same inherent values with respect to the first and second principal components. Since the first and second principal components are two factors which are most influential on the dispersion of points, whatever the factors are, the data columns of the conditions represented by those points plotted close to one another would vary almost equally in response to the variation of various conditions relating to the molding operation on the whole. Thus, the microprocessor 405 groups those points plotted close to one another and displays the distinction by their attributes on the display unit 406 as shown for example by the circular regions in FIG. 12 (step S12). For example, the measuring time of the condition "3" and the measuring completion position of the condition "5" belonging to a group B, have the almost equal eigen vectors c1 and e1 with respect to the first principal component and the almost equal eigen vectors c2 and e2 with respect to the second principal component, respectively. Therefore, the data columns of both the measuring time of the condition "3" and the measuring completion position of the condition "5" can be considered to vary with substantially equal characteristics in response to the variation of various conditions relating to the injection molding operation.

Figure 12:
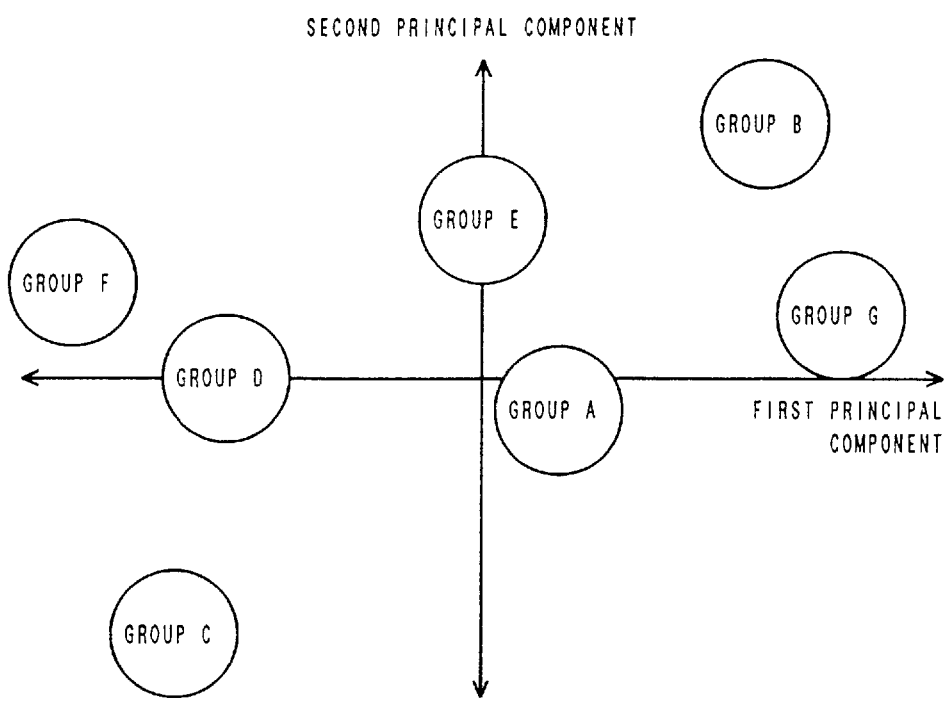
FIG. 12 is a scatter diagram in which data are divided into groups.

Thus, the operator of the injection molding operation can make the following consideration referring to the scatter diagrams as shown in FIGS. 11 and 12 (which are displayed overlapping with each other on the screen).

First, since the individual conditions in each group of FIG. 12 have data columns varying in substantially the same manner by the composite variation of the various conditions relating to the injection molding operation, i.e., by the unidentified factors of the first and second principal components, it is not so useful to select two or more conditions from the same group as data for discrimination of the product quality. For example, the measuring time of the condition "3" and the measuring completion position of the condition "5", which belong to the same group B, vary in the same manner by the factors of the first and second principal components, so that it is not so useful to adopt both of the two data columns for discrimination of the product quality. Therefore, when selecting conditions to be detected as data for the discrimination, only one condition should be selected from each of the groups. In the examples of FIGS. 11 and 12, the point of condition "3" and the point of condition "5" are located very close to each other as a result of the data standardization by eliminating dimensional difference among the individual data columns in the formula (1). Actually, however, sometimes there is a considerable difference in magnitude of variation of data columns. In such a case, for the discrimination of the product quality, it is more advantageous to select a largely variable condition from the same group for detection of an abnormality using an allowable value. It is possible to easily discriminate the variability of condition by directly displaying numeral values of data columns of the data file as shown in FIG. 2 based on a detection unit or by graphically displaying the numeral values on the display unit 406 as shown in FIG. 4 (or FIG. 5).

On the other hand, since the conditions belonging to different groups have data columns to vary differently by the composite variation of the various conditions relating to the injection molding operation, an accurate discrimination of the product quality can be performed with the conditions relatively independent of one another by selecting one condition from each different group to use their data for the discrimination of the product quality. The group located near the origin of the coordinate system in FIG. 12 is scarcely affected by the first and second principal components, in other words, the group is apt to be affected by other principal components. Since the individual principal components are independent from one another as is manifest from the equation (2), another approach can be made for a better product quality discrimination by selecting conditions from those groups near the origin of the coordinate system, which are apt to be affected by the other principal components which are independent of the first and second principal components, together with the conditions in the groups which are apt to be affected by the first and second principal components. Further, when it is designed that any two axes are selectable from the 1st to 22nd principal component axes to constitute a 2-dimensional rectangular coordinate system and the display picture as shown in FIG. 11 is switchable to display scatter diagrams, the groups which are apt to be affected by the first and second principal components as well as groups which are apt to be affected by the third and forth principal components independent of the first and second principal components can be obtained, which is convenient in independently selecting the various conditions for the discrimination of product quality. Of course, in selecting a condition from each group, the most variable data column should be selected.

Likewise the conventional art, such as Japanese Patent Laid-Open Publications Nos. Hei 6-155540 and 6-170907, occurrence of nonconforming products is determined by retrieving the detected data of each condition for every molding cycle and discriminating whether or not the value of the detected data is deviated from an allowable value. Therefore, a molding abnormality is detected as the abnormality in the item, such as the condition "1", the condition "2", the condition "3", . . . , condition "22". However, the indication of abnormal item does not mean that the molding conditions to be adjusted for elimination of the abnormality are easily known, and if the kind of such abnormality is not based on a controllable condition, it is impossible to directly control the condition.

For example, the measuring time of the condition "3" is a condition to be determined depending on the measurement completion position of the condition "5" and other molding conditions, such as the number of rotations of the screw and the back pressure for measuring, and is not a condition positively controllable by the injection molding machine. Therefore, if an abnormality of the measuring time is detected, the measuring time itself can not be adjusted for removing the abnormality of the measuring time. However, if the scatter diagrams as shown in FIGS. 11 and 12 are displayed by executing the above-described scatter diagram creating process based on the data columns as shown in FIG. 2, which have been obtained in the previous molding operations, other conditions having similar variation characteristics can be readily found by specifying the group containing the condition on which an abnormality is detected. If an adjustable molding condition can be found in the other conditions, it is possible to stabilize the conditions which are not directly adjustable by adjusting the other adjustable condition having the same variation characteristics in the same group. For example, if an abnormality is detected on the measuring time of the condition "3" in the example of FIG. 11, instead of adjusting the measuring time of the condition "3" itself, the measuring completion position of the condition "5" can be adjusted to eliminate the abnormality on the measuring time of the condition "3".

However, if the measuring completion position is changed, the filling resin quantity for the mold and the minimum cushion quantity must vary, so that the above change of the setting is not always appropriate.

Further studying the scatter diagrams of FIGS. 11 and 12, it can be found that there is a group C in origin symmetry with the group B containing the measuring time of the condition "3". Since the group C has reverse variation characteristics to the group B with respect to the first and second principal components, it is possible to modify conditions in the group B as desired, if any of the conditions in the group C is adjusted in the reverse direction. For example, assuming that an abnormality is detected on the measuring time of the condition "3" belonging to the group B, it is possible to stabilize the measuring time by adjusting the temperature of intermediate portion of the injection cylinder of the condition "13", which is included in the group C located in symmetry with the group B with respect to the origin.

As mentioned above, if an abnormality is detected on a condition not subjected to be controlled or a molding condition subjected to be controlled but prohibited from being modified easily, it is possible to eliminate the molding abnormality by adjusting other molding condition belonging to the same group and subjected to be modified, or by adjusting molding condition belonging to other group, which is located in origin symmetry with the former group and subjected to be modified. Instead of adjusting one condition other than the abnormal condition in the same group or adjusting one condition symmetrically located with the abnormal condition, other molding conditions capable of stabilizing these conditions may be adjusted.

Every time when any molding condition is adjusted as described above, the following steps should be taken. After the contents of the data file of FIG. 2 is cleared, the injection molding operations are continuously performed to detect and store the condition data and the scatter diagrams as shown in FIGS. 11 and 12 are displayed by executing the above-mentioned scatter diagrams creation process to confirm that the modification of the molding conditions has affected the data. If the points representing the various conditions are consequentially grouped to locate near the origin of the coordinate system, it means that the individual conditions are scarcely affected by the first and second principal components whatever the first and second principal components are at that time, and it is proved that the most stable molding conditions are set as long as the quality of the molded products are satisfactory.

It is difficult to know what are the factors of the first and second principal components directly from the scatter diagrams of FIG. 11 and FIG. 12. Anyway, however, it is certain that these first and second principal components are two main factors most affecting the dispersion of the correlations of the data. Considering the large effects (contribution rate) of the first and second principal components on the detected values of the various conditions, it can be said that the effects of factors resulting from the combination of the various conditions on the molding operation can be synthetically evaluated. If each of the conditions selected from each group varies linearly, it can be considered that a factor varying linearly without vibration is the dominant principal component and that the variation of room temperature or the water content rate of resin pellet is the first principal component or the second principal component.

In the foregoing embodiment, the factors affecting the product quality are analyzed by the primary component analysis. However, the factors affecting the product quality may be analyzed using other similar multivariate analyses, such as the cluster analysis and the factor analysis.

According to the present invention, even if the factors affecting the product quality are unknown, it is possible to find a group of the conditions giving the similar influence on the products, so that analyses of factors affecting the product quality, adjustment of the molding conditions for obtaining conforming molded products, and selection of the criteria for discrimination of conforming and nonconforming molded products will be made easier.

According to the present invention, the waste of time and labor resulting from repeated analyses adopting those data having similar variation characteristics with respect to the variations of a plurality of various molding conditions. Further, as those data varying independently of one another are selected for the discrimination of conforming products and nonconforming products, thereby improving the accuracy of the discrimination of the product quality. Also, by adjusting a single and easily adjustable condition in the same group, it is possible to facilitate adjustment of the molding conditions for obtaining conforming molded products.

In adjusting the molding conditions when an abnormality is detected in actual molding operation, it is easy to find a group which contains other conditions having the similar variation characteristics to those of the condition on which the abnormality is detected, and another group which contains conditions having reverse variation characteristics. Therefore, the conditions on which abnormalities are detected can be wholly stabilized by adjusting a controllable condition found in the above groups, even when it is difficult to directly control the conditions on which the abnormalities are detected.

We claim:

1. A method of analyzing factors affecting product quality of an injection molding machine, comprising the steps of:
   (a) detecting data of plural conditions relating to an injection molding operation for each predetermined molding cycle and storing the detected data as plural series of data for respective conditions:
   (b) executing a multivariate analysis to divide said plural conditions into groups of correlated conditions based on the respective series of data stored in said step (a);
   (c) grouping the conditions analogous in variation characteristic of the series of data; and
   (d) analyzing factors affecting the quality of products molded by the injection molding machine based on the conditions grouped in said step (c).

2. A method of analyzing factors affecting product quality of an injection molding machine, comprising the steps of:
   (a) detecting data of plural conditions related to an injection molding operation for each predetermined molding cycle and storing the detected data as plural series of data for respective conditions:
   (b) obtaining correlation coefficients representing data variation correlations of said plural conditions to create a correlation matrix, based on the respective series of data stored in said step (a);
   (c) obtaining eigen vectors of two principal components for each one of said plural conditions by performing a principal component analysis on said correlation matrix created in said step (b);
   (d) plotting points representing said plural conditions with the eigen vectors of said two principal components related with each orthogonal axis;
   (e) analyzing the quality of products based on positions of the points representing said plural conditions plotted in said step (d).

3. A method of analyzing factors affecting product quality according to claim 2, wherein said step (e) includes grouping the points plotted close to one another and selecting one of the conditions belonging to the same group as data for discriminating the product quality.

4. A method of analyzing factors affecting product quality according to claim 2, wherein said two principal components in said step (c) comprise a first principal component having the largest variance and a second principal component having the second largest variance.

5. A method of adjusting molding conditions for an injection molding machine, comprising the steps of:
   (a) detecting data of plural conditions related to an injection molding operation for each predetermined molding cycle and storing the detected data as plural series of data for respective conditions;
   (b) obtaining correlation coefficients representing data variation correlation of said plural conditions to create a correlation matrix, based on the respective series of data stored in said step (a);
   (c) obtaining eigen vectors of two principal components for each of said conditions by performing a principal component analysis on the correlation matrix created in said step (b), and plotting points representing said plural conditions with the eigen vectors of said two principal components related with each orthogonal axis;
   (d) grouping points located close to one another in the points plotted in said step (c); and
   (e) adjusting one of the plural conditions represented by the points grouped in said step (d) to stabilize the data of the one condition and to thereby stabilize the data of all other conditions in the same group.

6. A method of adjusting molding conditions for an injection molding machine, comprising the steps of:
   (a) detecting data of plural conditions related to an injection molding operation for each predetermined molding cycle and storing the detected data as plural series of data for respective conditions;
   (b) obtaining correlation coefficients representing data variation correlation of the plural conditions to create a correlation matrix based on the respective series of data stored in said step (a);
   (c) obtaining eigen vectors of two principal components for each of said conditions by performing a principal component analysis on the correlation matrix created in said step (b), and plotting points representing said plural conditions with the eigen vectors of said two principal components related with each orthogonal axis;
   (d) grouping points located close to one another in the points plotted in said step (c); and
   (e) adjusting one of the plural conditions represented by the points grouped in said step (d) to stabilize data of the conditions in a group which is located in origin symmetry with respect to a group containing one condition on said rectangular coordinate system and to thereby stabilize data of said one condition. (f) stabilizing data of one of the conditions represented by the points grouped in said step (d) by adjusting the conditions belonging to a group which is located in origin symmetry with respect to a group containing said one condition on said rectangular coordinate system.

7. A method of controlling molding conditions for an injection molding machine, comprising the steps of:

(a) detecting data of plural conditions related to an injection molding operation for each predetermined molding cycle and storing the detected data as plural series of data for respective conditions, every time when a molding condition related to the injection molding operation is adjusted:

(b) obtaining correlation coefficients representing data variation correlation of said plural conditions to create a correlation matrix based on the respective series of data stored in said step (a);

(c) obtaining eigen vectors of two principal components for each of said conditions by performing a principal component analysis on the correlation matrix created in said step (b), and plotting points representing said plural conditions with the eigen vectors of said two principal components related with each orthogonal axis;

(d) adjusting said molding conditions based on the points plotted in said step (c), and repeatedly executing the foregoing steps until data of all conditions or data of a particular condition converges.

8. A method of adjusting molding conditions for an injection molding machine, comprising the steps of:

(a) detecting data of plural conditions related to an injection molding operation for each predetermined molding cycle to store the detected data as plural series of data, and obtaining a standard deviation and a mean value for each data column, every time when any molding condition related to the injection molding operation is adjusted;

(d) obtaining correlation coefficients representing data variation correlation of said plural conditions to create a correlation matrix based on the respective series of data stored in said step (a);

(c) obtaining eigen vectors of two principal components for each of said conditions by performing a principal component analysis on the correlation matrix created in said step (b), and plotting points representing said plural conditions with the eigen vectors of said two principal components related with each orthogonal axis;

(d) adjusting the molding conditions based on the points plotted in said step (c), and repeatedly executing the foregoing steps until the standard deviation or value obtained by dividing the standard deviation by the mean value of data of all the conditions or a particular condition converge below a set value.

9. A method of adjusting molding conditions for an injection molding machine, comprising the steps of:

(a) detecting data of plural conditions related to an injection molding operation for each predetermined molding cycle and storing the detected data as plural series of data for respective conditions, every time when a molding condition related to the injection molding operation is adjusted;

(b) obtaining correlation coefficients representing data variation correlation of said plural conditions to create a correlation matrix based on the respective series of data stored in said step (a);

(c) obtaining eigen vectors of two principal components for each of said conditions by performing a principal component analysis on the correlation matrix created in said step (b), and plotting points representing said plural conditions with the eigen vectors of said two principal components related with each orthogonal axis;

(d) adjusting the molding conditions based on the points plotted in said step (c), and repeatedly executing the foregoing steps until the rate of contribution of all principal components or of a particular principal component converges below a set value.

10. A method of adjusting molding conditions for an injection molding machine, comprising the steps of:

(a) detecting data of plural conditions related to an injection molding operation for each predetermined molding cycle and storing the detected data as plural series of data for respective conditions, every time when a molding condition related to the injection molding operation is adjusted;

(b) obtaining correlation coefficients representing data variation correlation of said plural conditions to create a correlation matrix based on the respective series of data stored in said step (a);

(c) obtaining eigen vectors of two principal components for each of said conditions by performing a principal component analysis on the correlation matrix created in said step (b), and plotting points representing said plural conditions with the eigen vectors of said two principal components related with each orthogonal axis;

(d) repeatedly executing said steps (a), (b) and (c) until the individual points plotted in said step (c) are grouped in the vicinity of the origin of the rectangular coordinate system.

11. A molding condition controlling method according to claim 5, wherein the two principal components in said step (c) comprise a first principal component having the largest dispersion and a second principal component having the second largest dispersion.

* * * * *

UNITED STATES PATENT AND TRADEMARK OFFICE
CERTIFICATE OF CORRECTION

PATENT NO.: 5,815,397
DATED : September 29, 1998
INVENTOR(S): Saito et al

It is certified that error appears in the above-identified patent and that said Letters Patent is hereby corrected as shown below:

In the Abstract
Line 16, after "components" insert --,--;

Col. 5, Line 65, change "arrangements" to --arrangement--.

Col. 9, Line 22, change "(22x2222)" to --(22x22-22)--.

Col. 11, Line 33, change "be" to --$b_1$--.

Col. 17, Line 4, before ("f") begin new paragraph.

Signed and Sealed this

Sixth Day of April, 1999

Attest:

Q. TODD DICKINSON

*Attesting Officer*   Acting Commissioner of Patents and Trademarks